(12) United States Patent  (10) Patent No.: US 9,330,581 B2
Zinnbauer  (45) Date of Patent: May 3, 2016

(54) PLANT IDENTIFICATION STAKE (71) Applicant: Lovejoy Corporation, Inc., Greensboro, NC (US)

(72) Inventor: Gerald M. Zinnbauer, Cornelieus, NC (US)

(73) Assignee: Lovejoy Corporation, Inc., Greensboro, NC (US)

( * ) Notice: Subject to any disclaimer, the term of this patent is extended or adjusted under 35 U.S.C. 154(b) by 0 days.

(21) Appl. No.: 14/329,401

(22) Filed: Jul. 11, 2014

(65) Prior Publication Data

US 2015/0187235 A1  Jul. 2, 2015

Related U.S. Application Data (60) Provisional application No. 61/861,093, filed on Aug. 1, 2013.

(51) Int. Cl.
*G09F 23/00* (2006.01)
*G09F 3/20* (2006.01)

(52) U.S. Cl.
CPC ..................................... *G09F 3/206* (2013.01)

(58) Field of Classification Search
CPC ..................... A01G 9/02–9/028; Y10T 24/209
See application file for complete search history.

(56) References Cited

U.S. PATENT DOCUMENTS

| 767,132 | A | * | 8/1904 | Auld | 248/442.2 |
|---|---|---|---|---|---|
| 2,639,524 | A | | 5/1953 | Irving | |
| D199,828 | S | * | 12/1964 | Regan | D19/88 |
| 4,241,477 | A | * | 12/1980 | Freedom et al. | 24/67 R |
| 4,918,847 | A | | 4/1990 | Lee | |
| D314,493 | S | | 2/1991 | Keane | |
| 5,697,594 | A | * | 12/1997 | Adams et al. | 248/442.2 |
| D400,595 | S | * | 11/1998 | Hyde | D20/22 |
| 6,253,478 | B1 | * | 7/2001 | Kalavity | 40/645 |

FOREIGN PATENT DOCUMENTS

DE  8300801 U1 *  6/1983

* cited by examiner

*Primary Examiner* — Casandra Davis
(74) *Attorney, Agent, or Firm* — Trego, Hines & Ladenheim, PLLC (57) ABSTRACT

A device configured to retain an informational tag, near a plant in a positioning step and an attaching step. The device includes a display bed that defines a plane. A shoulder is defined on one side of the frame such that the shoulder extends away from the display bed and defines a stop. A retaining finger extends over the plane and defines a surface that faces and is spaced-away from the plane, A cover is positioned near the retaining finger and is movable from a first position to a second position. A prong is positioned on the cover and extends toward the plane when the cover is in the first position and extends through the plane when the cover is in the second position. The retaining finger surface and the display bed are configured to act cooperatively to retain a tag therebetween by friction.

13 Claims, 10 Drawing Sheets

PLANT IDENTIFICATION STAKE

FIELD OF THE INVENTION

The invention relates generally to identification devices for plants, and more specifically, to fixtures configured to retain informational material related to plants.

BACKGROUND OF THE INVENTION

Plants are often identified when presented for sale by a tag, label, card or the like containing information such as that related to plant care. The information can include planting tips, requirements for the amount of sunlight and water, and tolerance characteristics related to heat and cold. It is known to present such information with individual plants sold in containers at the point of sale on tags or labels that remain with the plant after sale. One conventional method of affixing such information is by positioning a post or stake such that it is attached to the container that the plant is in and the information is displayed prominently. Conventionally, this is done by positioning the stake within the soil within the container or by attaching it to the lip of the container. As used herein, the term "container" refers to any vessel used to receive a plant in soil such as a pot, a trough, a vase, a tray, and the like.

Some conventional fixtures for displaying printed information with plants are configured to support tags of paper, plastic or other material with the information related to plants indicated thereon.

A problem with some conventional display devices that are configured to support information is that they do not retain information tags securely. Another problem with conventional display devices is that litter and debris is formed when holes or perforations are created. Another problem with conventional display fixtures is that the tag must be held steady relative to the fixture while it is being attached. Stated another way, a problem with conventional display fixtures is that a tag cannot be held by the fixture in an aligned position prior to a final attaching step. It is believed that failure to hold a tag in an aligned position results in a poorly aligned or poorly attached tag. Another problem is that the time required to carefully align a tag for attaching it can lengthen the total time required to prepare the tag for attachment and cause inefficiencies and a resulting increase in time and money required for the attaching of a tag to a plant.

The present invention addresses these problems by providing a device for displaying printed information that is configured to receive a tag between at least one gripping finger and the body of the display surface in a first positioning phase. The device is also configured to position the tag prior to beginning the attaching phase during which the tag is perforated or pierced. The present invention provides all moving parts in a pre-aligned position thereby improving the efficiency of attaching a tag. Thus, the present invention is configured such that the device provided engages the display surface and retains the information tag in a fixed position relative to display device precisely and efficiently.

SUMMARY OF THE INVENTION

According to the present invention, there is provided a display device for displaying information associated with plants configured to retain information tags securely. The display device is also configured to enable rapid and efficient attachment of the information tag to the stake. In this regard, the display device includes a display-deck configured to support a tag, at least one retaining finger, and at least one pre-positioned hinged attachment member. The components are positioned such that during an attaching process, the tag is retained temporarily in a first positioning stage such that properly aligned prior to and during a second attaching stage.

According to one embodiment of the present invention, there is provided a device configured to retain an informational tag near a plant in a positioning step and an attaching step. The device includes a display bed that defines a plane. A shoulder is defined on one side of the frame such that the shoulder extends away from the display bed and defines a stop. A retaining finger extends over the plane and defines a surface that faces and is spaced-away from the plane. A cover is positioned near the retaining finger and is movable from a first position to a second position. A prong is positioned on the cover and extends toward the plane when the cover is in the first position and extends through the plane when the cover is in the second position. The retaining finger surface and the display bed are configured to act cooperatively to retain a tag therebetween by friction.

According to one aspect of the present invention, the prong is configured to pierce a tag positioned between the retaining finger and the display bed.

According to another aspect of the present invention, the shoulder is positioned to engage the tag along an edge of the tag such that the edge of the tag is retained in a predetermined position relative to the prong when the cover is in the first position.

According to another aspect of the present invention, the the prong is configured to cross the plane at a predetermined location relative to the shoulder when the cover is in the second position.

According to another aspect of the present invention, a bump is formed on the surface of the retaining finger such that the bump is configured to bias a tag through the plane defined by the display bed.

According to another aspect of the present invention, the cover is configured to move substantially toward the plane defined by the display bed when the cover moves from the first position to the second position.

According to another embodiment of the present invention, there is provided a device for supporting a label for a containerized plant. The device includes a body and a lip clip. The lip clip is configured to be attached to the lip or rim of a container for containing a plant is positioned at one end of body. A tag mounting portion is positioned at one end of the body opposite the container, the tag mounting portion includes a frame that defines a display bed on one surface thereof and the tag mounting portion includes a cover that is attached to the frame and movable between a first position and a second position. At least one prong extends from the cover toward the display bed. The cover is configured such that when it is in the first position, it is spaced-apart from the display bed such that a space defined therebetween sufficient that a tag can be maneuvered between the prongs and display bed.

According to another aspect of the present invention, the a structure extends into the space defined between the display bed and the cover that is configured to contact with sufficient force to bias the tag toward the display bed such that the tag is retained within the space.

According to another aspect of the present invention, a plane is defined by the display bed and a retaining finger is spaced-apart from the display bed. According to another aspect of the present invention, the retaining finger is spaced-apart from the display bed a predetermined distance that is less than the thickness of the tag.

According to another aspect of the present invention, a bump is defined on a surface of the retaining finger such that the bump extends toward the plane defined by the display bed.

According to another aspect of the present invention, a bump is defined on a surface of the retaining finger such that the bump extends through the plane defined by the display bed.

According to another aspect of the present invention, a bump is defined on a surface of the cover such that the bump extends through the plane defined by the display bed. The bump is configured to deflect the tag such that the tag extends through the plane defined by the display bed and retain a tag positioned between the cover and the display bed.

According to another embodiment of the present invention, there is provided a method for retaining a tag on a display device. The method includes the steps of: A) providing a display bed that defines a plane; a shoulder defined on one side of the frame such that the shoulder extends away from the display bed toward a retaining finger that extends over a plane defined by the display bed and the retaining finger defines a surface that faces and is spaced-away from the display bed; a cover positioned near the retaining finger that is movable from a first position a second position; a prong that extends from the cover toward the display bed; B) positioning a tag between the retaining finger and the display bed; C) engaging one edge of the tag with the stop; D) initiating movement of the cover such that the cover moves toward the tag; and E) piercing the tag with the prong.

According to another aspect of the present invention, the method includes the step of retaining the tag in the device after the engaging step and before moving the cover by friction generated by the retaining finger and the display bed.

BRIEF DESCRIPTION OF THE DRAWINGS

For a fuller understanding of the nature and objects of the present invention, reference should be made to the following detailed description taken in connection with the accompanying drawings, wherein.

DETAILED DESCRIPTION OF THE PREFERRED EMBODIMENTS

Embodiments of the present invention are directed to a display device 10 for retaining information in association with a containerized plant. Display device 10 is configured to attach to the containerized plant either by having a portion being positioned directly in the soil or by being engaged with a lip 17 of a container 15. The display device is also configured to position an information tag such that it is spaced-away from the plant so that it can be easily read while being closely associated with the plant. As used herein, the term "tag " refers to a substantially planar substrate for printing, writing, engraving such as tags, labels, papers, films and the like. By way of example and not limitation, such tags can be formed of one or more layers of paper, plastic, metal foil, and a combination thereof. While typically self-supporting and one layer, tags can also be multiple layers or pages and can also drape or hang.

Figure 1:
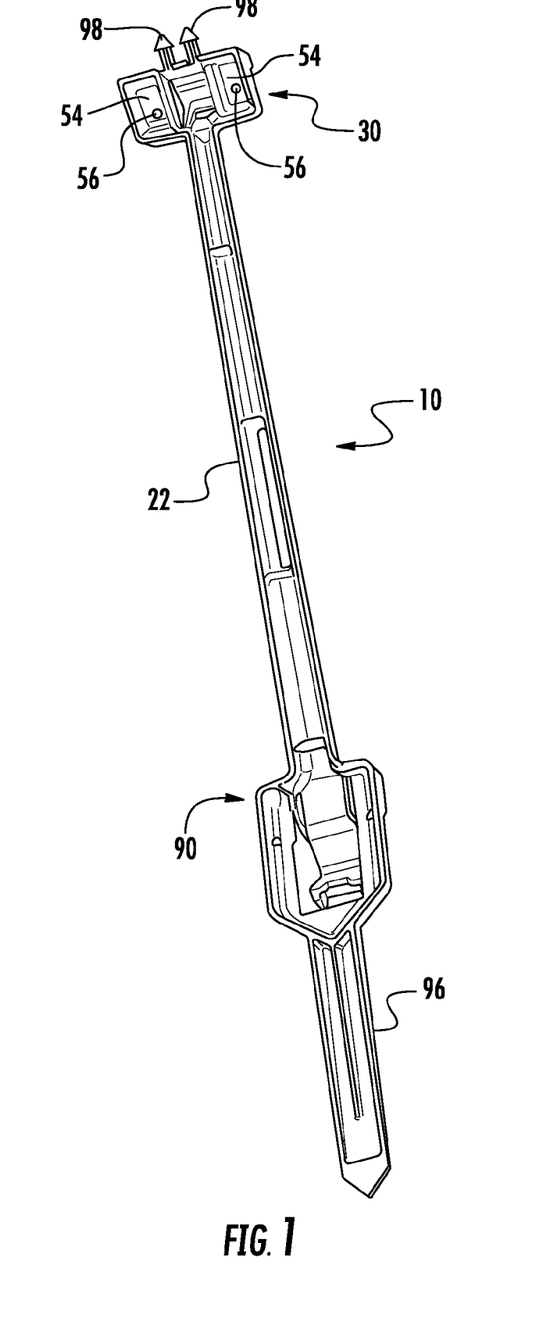
FIG. 1 is a back perspective view of a plant identification device according to a preferred embodiment.

Referring to FIG. 1, in accordance with one embodiment of the invention, a display device 10 is shown. Display device 10 includes a body 22, a tag mounting portion 30, and a lip clip 90.

Figure 2:
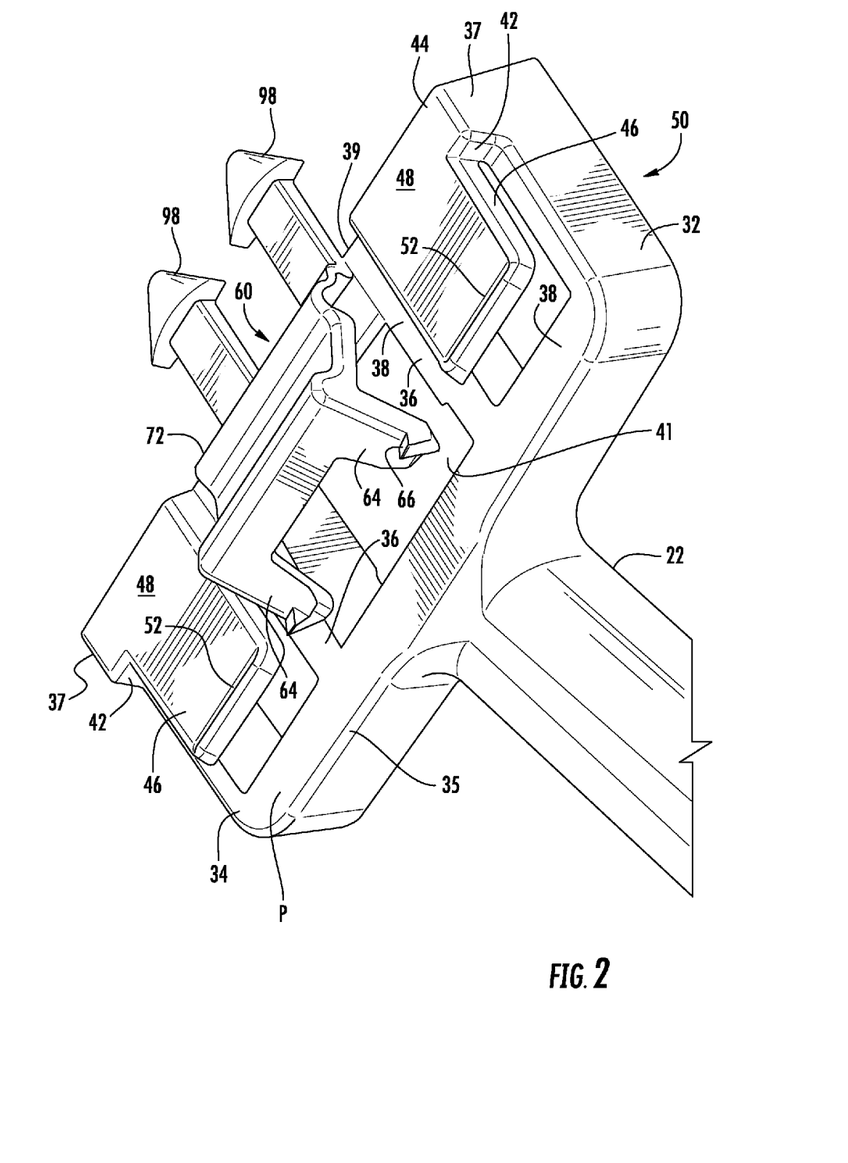
FIG. 2 is an overhead perspective view of a tag retaining portion of the plant identification device shown in FIG. 1.
Figure 3:
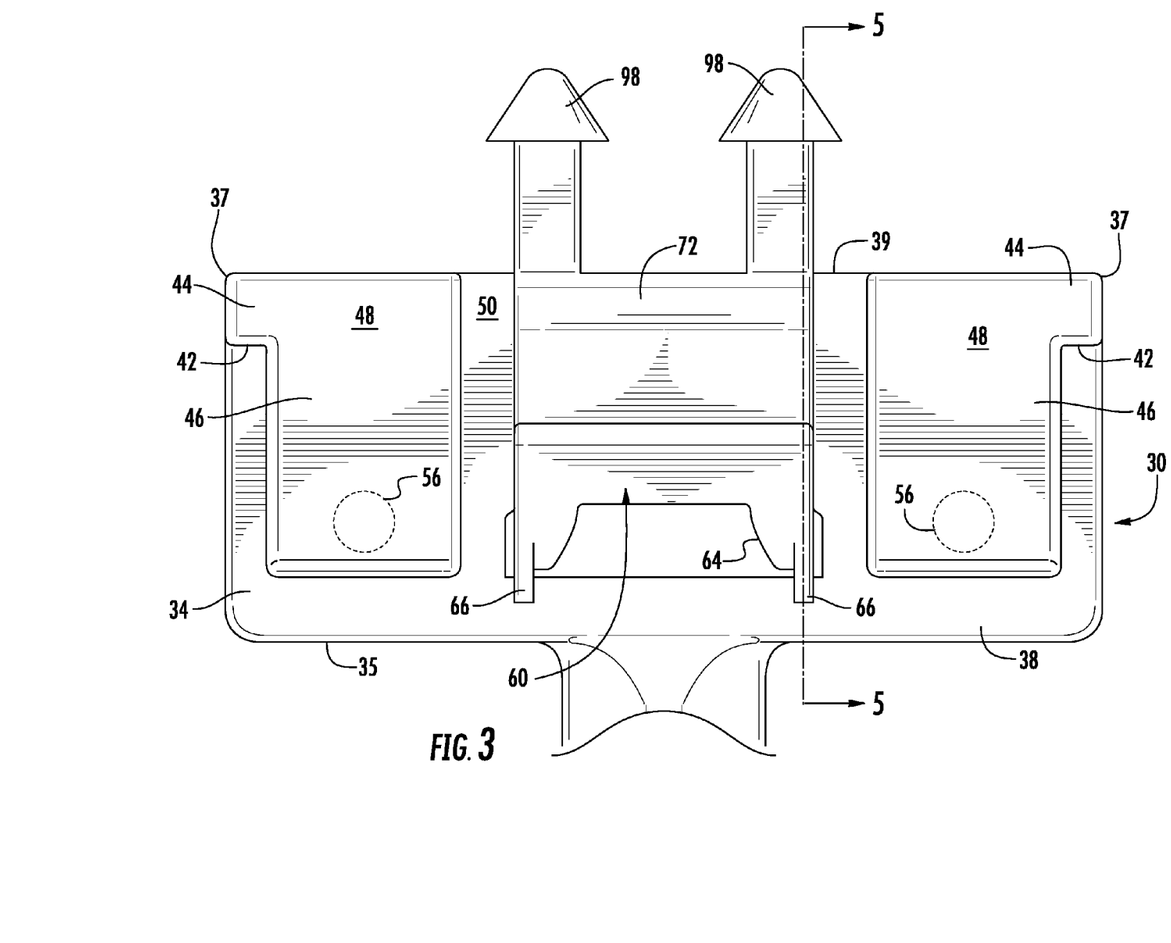
FIG. 3 is a plan view of the tag retaining portion shown in FIG. 2.

Referring now to FIG. 2, tag mounting portion 30 includes a frame 32. In the illustrated embodiment, frame 32 includes an outer perimeter 34 that defines a generally rectangular shape. At least one crosspiece 36 extends between opposing sides of frame 32. Frame 32 defines a display bed 38 on one surface thereof. Display bed 38 is substantially planar as shown in FIG. 1. It should be appreciated that in other embodiments, display bed 38 is configured to conform to non-planar shapes such as, by way of example and not limitation, the following: a curve, a convex dome, a concave dome, and a combination thereof. Display bed 38 is configured to provide support to an information tag 19 as can be seen in FIGS. 7A-7D.

Continuing to refer to FIG. 2, frame 32 includes two long opposing sides 35 and 39. Frame 32 is attached to body 22 at about the center-point of long opposing side 35. Extending from frame 32 along long opposing side 39 is at least one stop 42. In the illustrated embodiment, there are two stops 42 positioned at opposing ends 37 of side 36. Display bed 38 defines a plane P and stop 42 is formed from a raised shoulder 44 that extends up beyond plane P.

In the illustrated embodiment, at least one retaining finger 46 is positioned between stops 42. It should be appreciated that in one embodiment, retaining finger 46 could be positioned such that it is outside of stops 42, i.e. between a stop 42 and an end 37. In another embodiment, a stop 42 could be positioned between a pair of fingers 46.

As shown in FIG. 2, the retaining finger 46 includes a retaining finger body 48. Retaining finger body 48 extends from shoulder 44 to a distal end 52. Retaining finger body 48 defines a retention surface 54 that is exposed toward plane P defined by bed 38 and positioned such that it is spaced-apart from plane P. In a preferred embodiment, at least one bump 56 extends from retention surface 54 toward display bed 38 such that bump 56 passes through plane P. Alternatively, bump 56 is positioned in such that is spaced away from plane P. When configured to be spaced away from plane P, bump 56 is spaced apart from plane P a distance less than the thickness of the display tag to be retained.

As shown in FIG. 2, a cover 60 is positioned between retaining fingers 46. Cover 60 includes at least one pronged portion 64 that is pointed and has a barb 66. Cover 60 extends from a hinge 72 toward prong 64. In the illustrated embodiment, pronged portion 64 is configured to penetrate tag 19 without predefined perforations or holes defined within tag 19. In the illustrated embodiment, pronged portion 64 is pointed.

Figure 4:
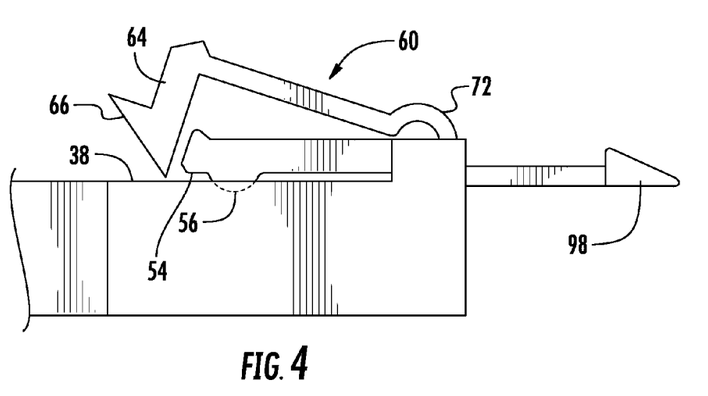
FIG. 4 is a right side view of the tag retaining portion shown in FIG. 3.

Cover 60 is configured to be movable between from first position to a second position. FIG. 4 shows cover 60 in the first position. When cover 60 is in the first position, it is positioned such that cover 60 is spaced-apart from plane P such that sufficient space is provided for tag 19 to be maneuvered between prongs 64 and display bed 38. Display device 10 is molded such that cover 60 is in this position initially. Stated another way, cover 60 is pre-positioned to be aligned relative to outer perimeter 34 and display bed 38 such that cover 60 can be quickly moved from the first position to the second position. As seen from the side, cover 60 and frame 32 are close to substantially parallel and form a v-shape when in the first position.

Figure 5:
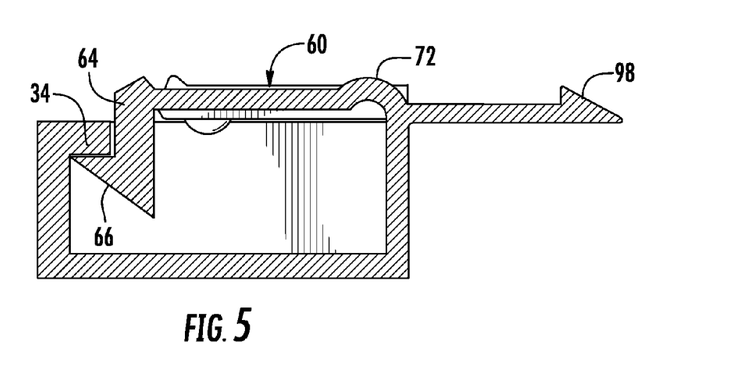
FIG. 5 is a cutaway view of the tag retaining portion as shown in FIG. 3 taken along the line 5-5.
Figure 6:
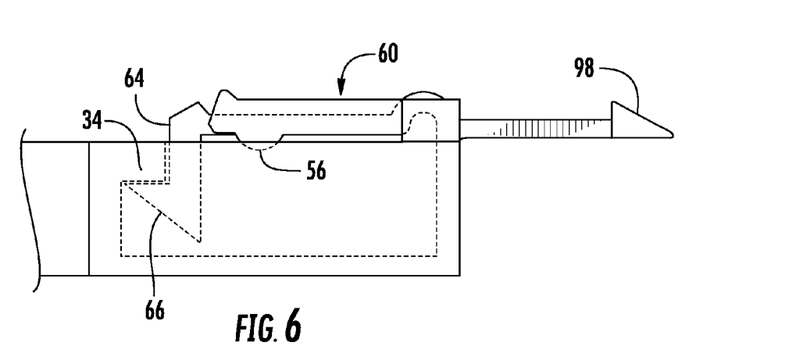
FIG. 6 is a right side view of the tag retaining portion shown in FIG. 3 showing major hidden elements in dashed lines.

FIGS. 5 and 6 show cover 60 in the second position. Prong 64 and barb 66 are configured such that barb 64 is operable to deflect away from outside perimeter 34 of frame 32 and toward the interior of frame 32 as cover 60 is moved from the first position to the second position. Prong 64 is configured such that when barb 66 passes below perimeter 34, prong 64 returns to its original position relative to the body of cover 60 such that barb 66 is engaged with perimeter 34 of frame 32. In this manner, barb 66 is trapped by perimeter 34 of frame 32 and cover 60 is retained in the second position.

It should be appreciated that frame 32 and cross pieces 36 are configured such that they define spaces 41 as shown in FIG. 2 with sufficient clearance for prongs 64 and cover 60 to move between retaining fingers 46.

Figure 8:
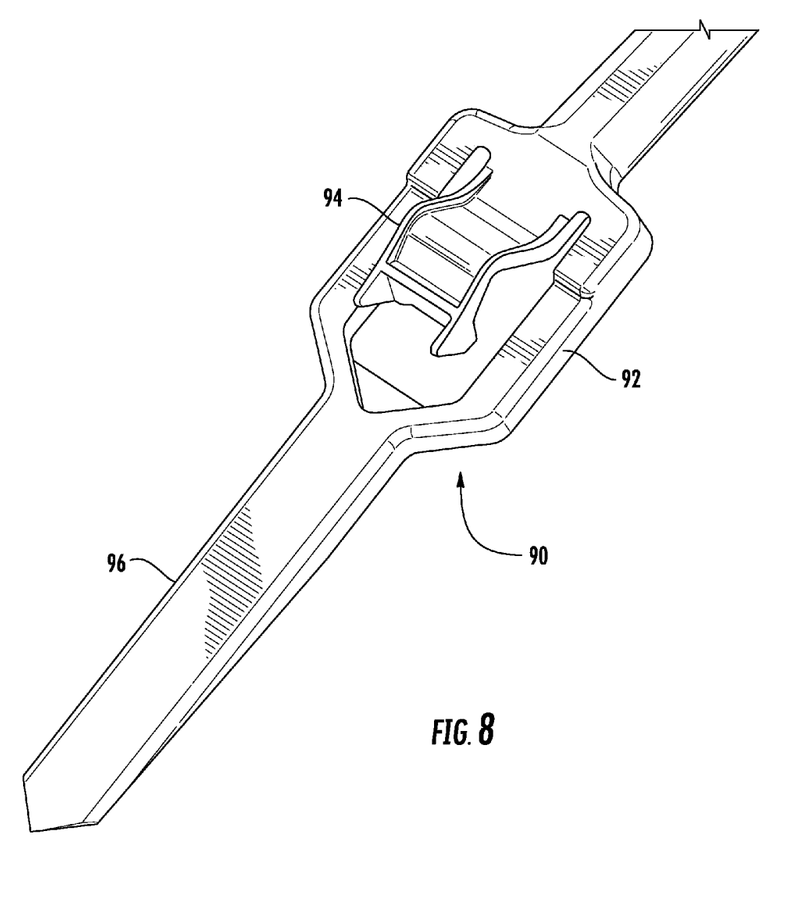
FIG. 8 is a perspective view of an end of the plant identification device wherein the end is configured to attach to a container taken from a first side.
Figure 9:
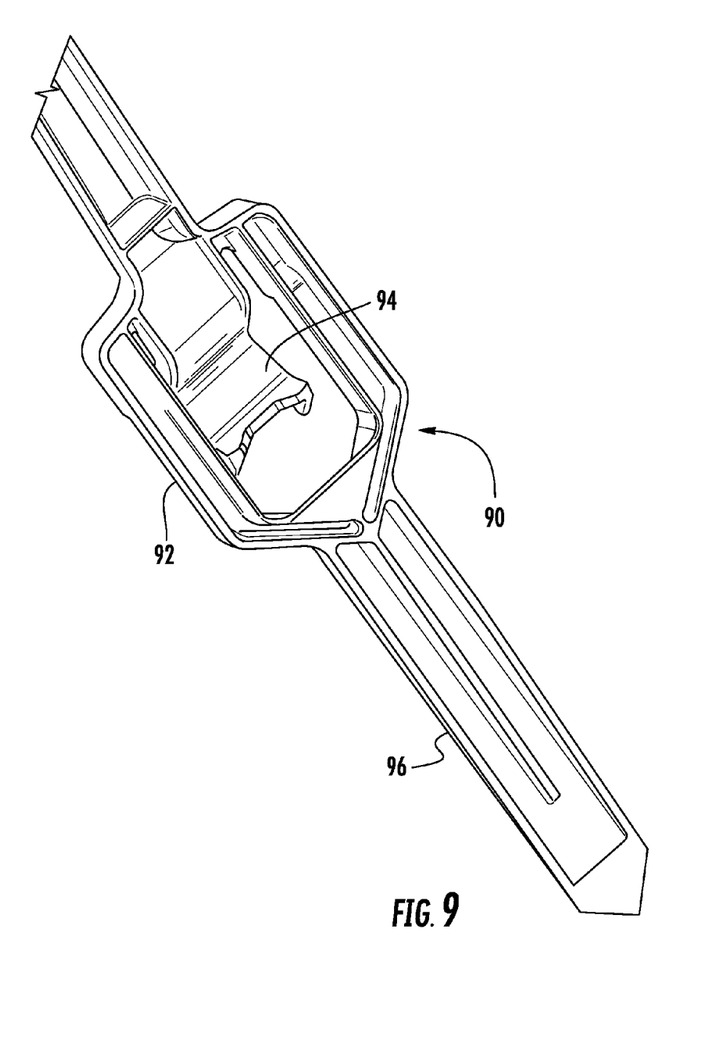
FIG. 9 is a perspective view of the portion of the plant identification device shown in FIG. 8 taken from a second side.

As can be seen in FIG. 1, lip clip 90 is positioned at one end of body 22 opposite from tag mounting portion 30. Referring now to FIGS. 8 and 9, lip clip 90 includes a bracket 92 and a finger 94. Finger 94 is configured to trap or otherwise engage the lip 17 of a container 15. It should be appreciated that Finger 94 is flared away from bracket 92 such that it is dimensioned to receive an engage lips of various dimensions. In this regard a device 10 can be used to display information on containerized plants wherein the associated lips of different dimensions. Finger 94 is configured to be displaced away from bracket 92 as the lip 17 is inserted between finger 94 and bracket 92. Likewise, finger 94 is configured to return to a position closer to bracket 92 thereby trapping the lip 17 of a container 15 between finger 94 and bracket 92. The Stake 96 extends from lip clip 90. Lip clip 90 is configured to support display device 10 relative to a containerized plant as shown in FIG. 14. Stake 96 is configured to penetrate ground or soil contained within a container 15 and to provide further support to display device 10.

Figure 12:
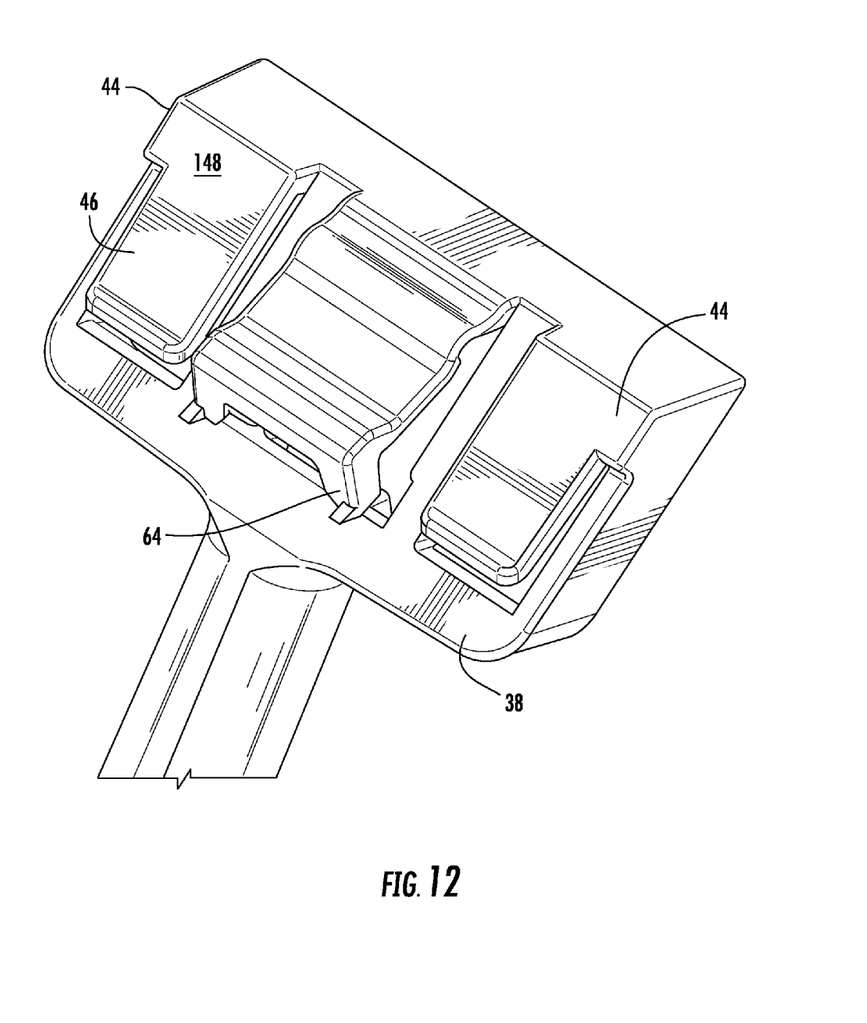
FIG. 12 is a perspective view of the tag retention portion of a plant identification device according to one embodiment of the present invention.

As shown in FIG. 1, Auxiliary prongs 98 extend from frame 32 away from body 22 in one embodiment. Auxiliary prongs 98 are configured to receive additional display material. In another embodiment as shown in FIG. 12, no auxiliary prongs extend from frame 32.

In the illustrated embodiment, display device 10 is formed from a molded plastic material. It should be appreciated that display device 10 can be formed from many different suitable materials. By way of example and not limitation, such materials can include one of the following: styrene-acrylonitrile (SAN), acrylic, co-polyester, metal, polymers, polyethylene, polypropylene, wood, and a combination thereof.

Figures 7A, 7B:
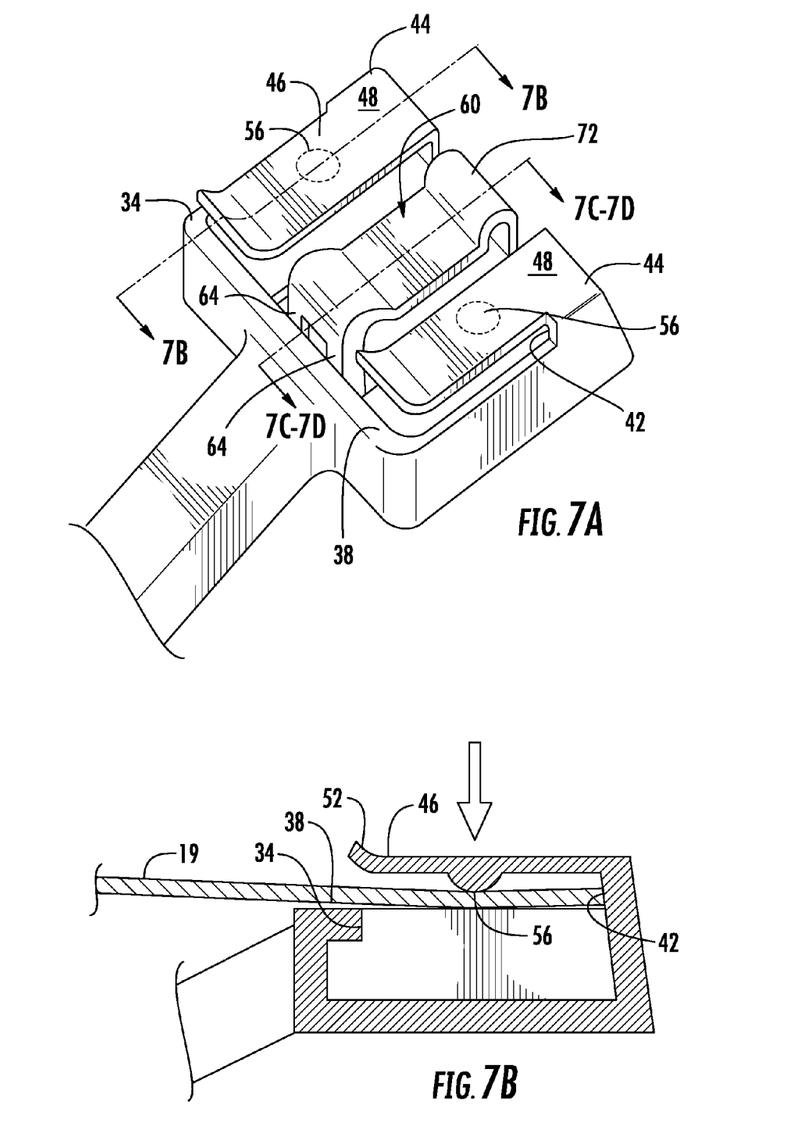
FIG. 7A is a side view of the tag retaining portion according to another embodiment of the present invention.
FIG. 7B is a cutaway side view of the tag retaining portion shown in FIG. 7A taken along line 7B-7B wherein an information tag is positioned therein.
Figure 7C:
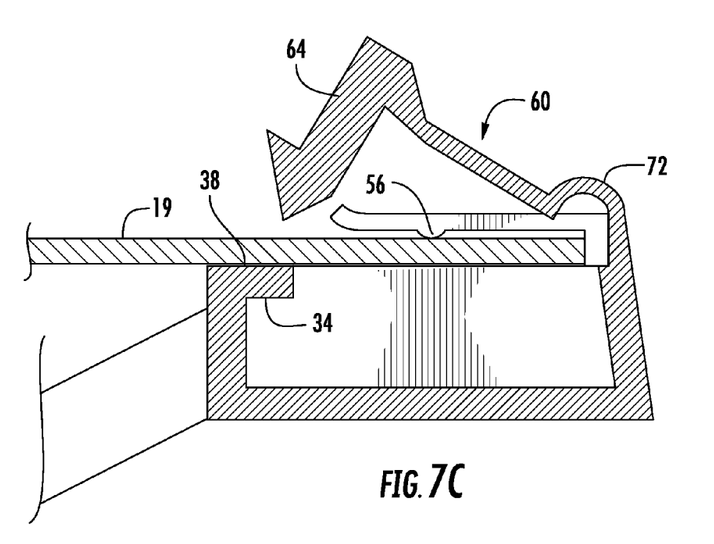
FIGS. 7C is a cutaway side view of the tag retaining portion shown in FIG. 7A taken along line 7CD-7CD wherein an information tag is positioned therein.

The present invention can be better understood through a description of the operation thereof in reference to FIGS. 7A-7D. FIGS. 7A through 15 show an alternative embodiment of the invention that does not include prongs 98. The operation of display device 10 includes a positioning step followed by an attaching step. First a display device 10 is provided as shown in FIG. 7A. Referring now to FIG. 7B, a tag 19 is moved within tag mounting portion 30. In this regard, tag 19 is first passed between display bed 38 and retaining fingers 46. Tag 19 is then positioned such that one edge engages a stop 42 as shown in FIG. 7B. While tag 19 is moved such that it is engaged with a stop 42, bumps 56 act to deflect tag 19 toward display bed 38. As seen in FIG. 7C, the deflection caused by bumps 56 prior to the attaching step binds tag 19 against display bed 38 and thus acts to increase friction between tag 19 and display bed 38. In this manner retaining tag 19 in a predetermined position relative to display bed 38. At this point, tag 19 is in position for the attaching step.

Figure 7D:
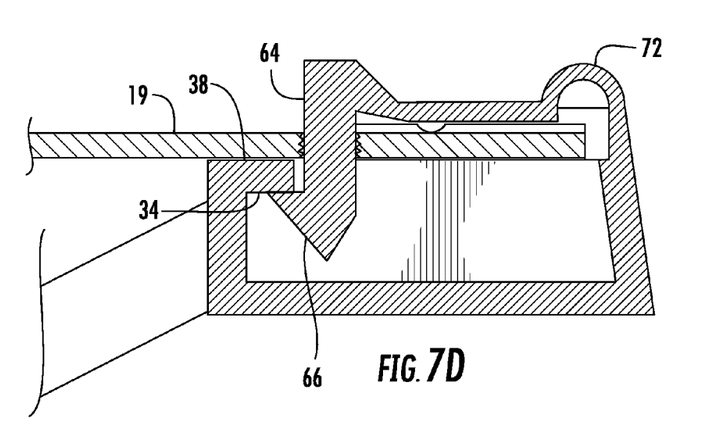
FIGS. 7D is a cutaway side view of the tag retaining portion shown in FIG. 7A taken along line 7CD-7CD wherein an information tag is pierced by the tag retaining portion such that the tag is attached to the tag retaining portion.

In the attaching step, cover 60 is moved from the first position toward the second position described above. During this step, penetrating tag 19 by prong 64 and barb 66 is accomplished. At the conclusion of the attaching step, prong 64 passes through tag 19 and barb 66 engages perimeter 34 as shown in FIG. 7D. When prong 64 extends through tag 19 and cover 60 is in the second position such that barb 66 engages outer perimeter 34, tag 19 is retained on display device 10.

It should be appreciated that the friction achieved when tag 19 is pressed against display bed 38 by bumps 56 might not be sufficient to retain tag 19 on display device 10 for an extended period of time. But it is believed to be sufficient to retain tag 19 in position briefly such that cover 60 can be moved from the first position, clear of tag 19, to the second position wherein prong 64 penetrates plane P and extends through tag 19 in the attaching step.

Figure 10:
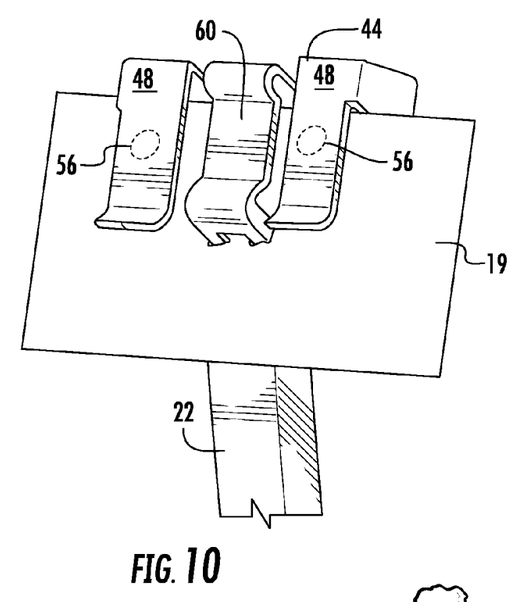
FIG. 10 is a perspective view of the retaining portion of the identification device shown in FIG. 7 and a tag is retained therein.
Figure 11:
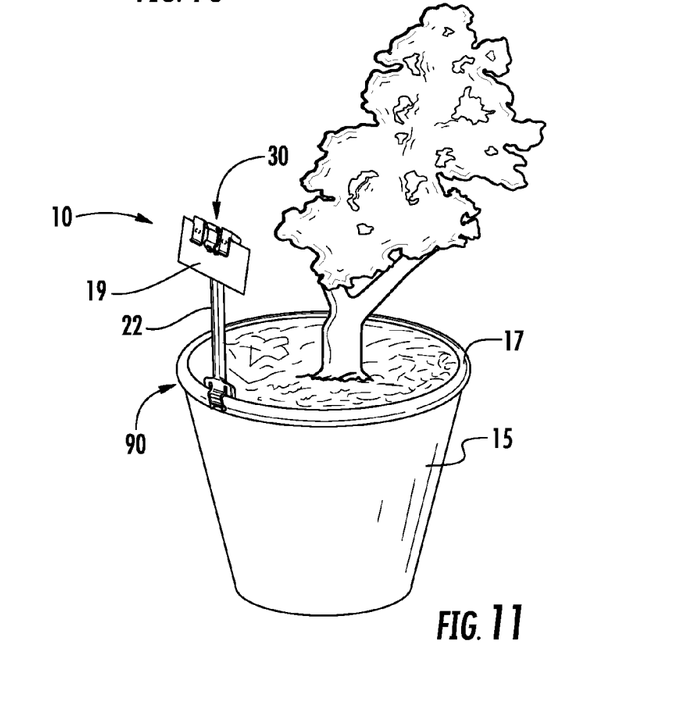
FIG. 11 is a view of the plant identification device according to the present invention in use with a containerized plant.

As can be seen in FIG. 10, a tag 19 is retained in tag mounting portion 30 after completion of the method above. A further step of clipping lip clip 90 to lip 17 of container 15 attaches device 10 to container 15. In this manner device 10, and consequently tag 19, can be attached to container 15 without dirt or other substrate in container 15. However it is believed that generally stake 96 will be positioned in soil with container 15 as the step of clipping lip clip 90 to lip 17 is completed. Alternatively, stake 96 can be inserted within the soil or other substrate within container 15 such that device 10 is associated with a plant without lip clip 90 being attached to lip 17.

The present invention provides a plant information display device that addresses many of the problems associated with conventional display devices. The display device of the present invention retains an information tag without requiring additional expense of preforming holes and perforations for retention. And without creating loose debris and trash during the act of retaining the tag. The present invention provides a display device configured to enable easy attachment of an informational tag to the display device in a precise and efficient manner. While the present invention has been illustrated and described with reference to preferred embodiments thereof, it will be apparent to those skilled in the art that modifications can be made and the Invention can be practiced Having described the invention, the following is claimed:

1. A display device configured to retain an informational tag near a plant, the device comprising:
   a display bed that defines a plane;
   a shoulder defined on one side of the display bed such that the shoulder extends away from the display bed and defines a stop;
   a retaining finger extends over the plane and the retaining finger defines a surface that faces and is spaced-away from the plane;
   a cover positioned near the retaining finger and the cover is movable from a first position to a second position;
   a prong that extends from the cover toward the plane defined by the display bed when the cover is in the first position and the prong extends through the plane when the cover is in the second position;
   wherein the distance between the surface and the display bed is dimensioned such that the retaining finger surface and the display bed are configured to act cooperatively such that a tag positioned therein is retained by friction when the cover is in the first position.

2. A display device according to claim 1, wherein the prong is configured to pierce a tag positioned between the retaining finger and the display bed.

3. A display device according to claim 2, wherein the shoulder is positioned to engage the tag along an edge of the tag such that the edge of the tag is retained in a predetermined position relative to the prong when the cover is in the first position.

4. A display device according to claim 3, wherein the prong is configured to cross the plane at a predetermined location relative to the shoulder when the cover is in the second position.

5. A display device according to claim 4, the device comprising:
   a bump formed on the surface of the retaining finger such that the bump is configured to bias a tag through the plane defined by the display bed.

6. A display device according to claim 1, wherein the cover is configured to move substantially toward the plane defined by the display bed when the cover moves from the first position to the second position.

7. A device for supporting a label for a containerized plant, the device comprising:
   a body;
   a lip clip configured to be attached to a container for containing a plant is positioned at one end of body;
   a tag mounting portion is positioned at one end of the body opposite the lip clip, the tag mounting portion includes a frame that defines a display bed on one surface thereof and the tag mounting portion includes a cover that is attached to the frame and movable between a first position and a second position;
   a plane defined by the display bed
   a retaining finger spaced-apart from the display bed
   at least one prong extends from the cover toward the display bed; and
   wherein the cover is configured such that when it is in the first position, it is spaced-apart from the display bed such that a space defined therebetween is sufficient that a tag can be maneuvered between the prongs and display bed.

8. A device for supporting a label according to claim 7, wherein
   the retaining finger is spaced-apart from the display bed a predetermined distance that is less than the thickness of the tag.

9. A device for supporting a label according the claim 8, the device comprising:
   a bump defined on a surface of the retaining finger such that the bump extends toward the plane defined by the display bed.

10. A device for supporting a label according the claim 9, the device comprising:
    a bump defined on a surface of the retaining finger such that the bump extends through the plane defined by the display bed.

11. A device for supporting a label according the claim 9, the device comprising:
    a bump defined on a surface of the cover such that the bump extends through the plane defined by the display bed;
    and the bump is configured to deflect the tag such that the tag extends through the plane defined by the display bed and retain a tag positioned between the cover and the display bed.

12. A method for retaining a tag on a display device, the method comprising the steps of:
    providing a display bed that defines a plane; a shoulder defined on one side of the frame such that the shoulder extends away from the display bed toward a retaining finger that extends over a plane defined by the display bed and the retaining finger defines a surface that faces and is spaced-away from the display bed; a cover positioned near the retaining finger that is movable from a first position a second position; a prong that extends from the cover toward the display bed;
    positioning a tag between the retaining finger and the display bed;
    engaging one edge of the tag with the shoulder;
    initiating movement of the cover such that the cover moves toward the tag;
    piercing the tag with the prong.

13. A method for retaining a tag on a display device according to claim 12, the method further comprising the steps of:
    retaining the tag in the device after the engaging step and before moving the cover by friction generated by the retaining finger and the display bed.

* * * * *